United States Patent [19]

Hammon et al.

[11] 4,109,046

[45] Aug. 22, 1978

[54] FLEXIBLE MULTI-LAYER MAGNETIC RECORDING MEDIA

[75] Inventors: Fritz Hammon; Manfred Ohlinger; Horst Grosselfinger, all of Frankenthal; Heinz Stritzinger; Job-Werner Hartmann, both of Ludwigshafen, all of Fed. Rep. of Germany; Eduard Schoenafinger, Jenesien, Italy; Walter Schneider, Ludwigshafen, Fed. Rep. of Germany

[73] Assignee: BASF Aktiengesellschaft, Ludwigshafen, Fed. Rep. of Germany

[21] Appl. No.: 747,355

[22] Filed: Dec. 3, 1976

[30] Foreign Application Priority Data

Dec. 13, 1975 [DE] Fed. Rep. of Germany ....... 2556188

[51] Int. Cl.² ............................................. H01f 10/02
[52] U.S. Cl. .................................... 428/216; 428/328; 428/336; 428/339; 428/539; 428/900
[58] Field of Search .......................... 427/48, 127–132; 252/62.54; 428/64, 309, 328, 336, 339, 900, 539

[56] References Cited

U.S. PATENT DOCUMENTS 3,761,311   9/1973   Perrington et al. .................. 117/239

*Primary Examiner*—Bernard D. Pianalto
*Attorney, Agent, or Firm*—Keil, Thompson & Shurtleff

[57] ABSTRACT

Flexible multi-layer magnetic recording media comprising a non-magnetic flexible base and, applied thereto, two superposed magnetizable layers which contain a homogeneous mixture of acicular magnetic chromium dioxide in an organic binder.

According to the invention, the magnetizable layer adjacent to the base contains a chromium dioxide having a specific surface area, measured by the BET method, of from 15 to 25 $m^2/g$, while the outer magnetic layer contains a chromium dioxide having a specific surface area, measured by the BET method, of from 26 to 35 $m^2/g$.

Such magnetic recording media are distinguished by uniformly high sensitivity over the entire audible frequency range even if close manufacturing tolerances are not maintained.

1 Claim, No Drawings

FLEXIBLE MULTI-LAYER MAGNETIC RECORDING MEDIA

The present invention relates to flexible multi-layer magnetic recording media exhibiting an improved frequency response, comprising a non-magnetic flexible base and, applied thereto, two superposed magnetizable layers which contain a homogeneous mixture of acicular magnetic chromium dioxide in an organic binder.

Various multi-layer magnetic recording media have already been disclosed. At an early stage steps were taken to improve the frequency response of a magnetic tape by the provision of at least two layers, the magnetic properties of the individual layers being correlated to the configuration of the magnetic field produced by the recording head, in respect of long and short wavelengths. This was achieved by different ratios of coercive force to residual induction (U.S. Pat. No. 2,643,130 and U.S. Pat. No. 2,691,072), by using correlated coercive forces (U.S. Pat. No. 2,647,954 and German published application No. 1,285,005), or by orientation of the magnetic particles in the individual layers in different directions (U.S. Pat. No. 3,185,755, U.S. Pat. No. 3,052,567 and German published application No. 1,279,089).

Attempts have also been made to improve the recording sensitivity by using a multi-layer medium, specifically by increasing the packing density of the magnetic pigment in the outer layer (British Pat. No. 997,439). It has also already been disclosed that the mechanical properties of a magnetic tape, specifically those of the magnetic layer, can be improved by employing an appropriate upper layer which either comprises a particularly abrasion-resistant binder (German published application No. 1,280,931) or a pressure-in-sensitive magnetic pigment (German published application No. 1,938,006) or a magnetic pigment which causes less head wear (German published application No. 2,305,247). The problem raised by the use of magnetic pigments of improved residual induction but lower magnetic stability under mechanical stress has been solved by employing an outer layer containing a stable magnetic pigment (U.S. Pat. No. 2,941,901). Furthermore, it has been disclosed that the marked modulation noise produced by multi-layer magnetic tapes as a result of irregularities at the interface of the layers can be reduced by following a particular procedure.

On applying the above teachings to the recording of very short wavelengths at very low tape speeds, it was found that it was advantageous to match the coercive force of the outer layer to the total thickness of the two layers (U.S. Pat. No. 3,761,311). However, it has been found that with such magnetic recording media the output signal level in the middle frequency range is reduced to such an extent that the desired degree of linearity over the entire audible frequency range is no longer achieved. To avoid this disadvantage, it has been proposed to provide a recording medium with two different magnetizable layers, the lower layer containing gamma-iron (III) oxide particles and the upper layer containing acicular chromium dioxide (German laid-open application No. 2,434,940). However, linearization of the output signal level over the entire audible frequency range requires precise optimization of the thicknesses of the individual layers, the total thickness of the two layers and the residual induction and the coercive force. This necessitates narrow, and therefore uneconomical, production tolerances. A further disadvantage is that such recording media can only be advantageously used at one bias setting which is between the standard bias settings for gamma-iron(III) oxide tapes and chromium dioxide tapes.

It is an object of the present invention to avoid these disadvantages. More particularly, it is an object of the invention to provide a magnetic recording medium which, whilst showing improved sensitivity in the low frequency and high frequency ranges, does not suffer from a deterioration of the sensitivity in the middle audible frequency range and which can be used on recording and playback apparatus at a predetermined standard bias setting. It is a further object of the invention to provide a magnetic recording medium of the said type which can be manufactured on existing equipment, and within the usual tolerances.

We have found that these objects are achieved and that magnetic recording media which satisfy the above requirements are obtained if two superposed magnetizable layers, each from 0.3 to 15/$\mu$m thick, of a homogeneous mixture of acicular magnetic chromium dioxide in an organic synthetic binder, with or without further additives, are applied to a non-magnetic flexible base, the magnetizable layer adjacent to the base containing a chromium dioxide having a specific surface area, measured by the BET method, of from 15 to 25 $m^2/g$, and the outer magnetic layer containing a chromium dioxide having a specific surface area, measured by the BET method, of from 26 to 35 $m^2/g$.

Acicular magnetic chromium dioxides employed in accordance with the invention may be manufactured by conventional processes. It has proved particularly advantageous to produce the chromium dioxides by the process proposed in German laid-open application No. 2,022,820. In order to obtain chromium dioxide pigments having specific surface areas of from 15 to 25 $m^2/g$, chromium trioxide is converted to chromium dioxide in the presence of water, with the addition of iron and antimony as modifying elements in a ratio of 4:1 and in a total amount of from 0.3 to 0.6% by weight, based on chromium dioxide, at from 280° to 350° C and a pressure of about 400 bars. After the reaction, the pressure is reduced to 1 bar in the course of from 10 to 14 hours and at the same time the temperature is lowered to values which are still above 200° C. In order to obtain chromium dioxide pigments with surface areas of from 26 to 35 $m^2/g$, the ratio of iron to antimony is 6:1 and the total amount of modifying elements is more than 0.9% by weight, based on chromium dioxide. The pressure is lowered to 1 bar in the course of from 7 to 10 hours and at the same time the temperature is brought to less than 100° C.

The specific surface area of the pulverulent material is determined by the conventional BET method, eg. in the Haul-Dumbgen version, using the "Areameter" manufactured by Ströhlein, 4 Düsseldorf, West Germany.

The other properties of the chromium dioxide are similar to those of pigments which are employed for conventional chromium dioxide magnetic tapes. Accordingly, chromium dioxide pigments characterized by the surface areas required by the invention, and possessing a coercive force of from 32 to 48 kiloamps/m, may be employed. Advantageously, pigments having a surface area of from 15 to 25 $m^2/g$ and a coercive force of from 32 to 42 kiloamps/m are used for the lower layer and pigments having a surface area of from 26 to 35 $m^2/g$ and a coercive force of from 38 to 48 kiloamps/m are used for the upper layer. A lower layer containing a pigment with a coercive force of 40.2 kiloamps/m and an upper layer containing a pigment with a coercive force of 39.8 kiloamps/m have proved particularly advantageous for a magnetic recording medium according to the invention.

The magnetic recording media of the invention are manufactured by conventional methods. The non-magnetic bases used are those conventionally employed, in particular films of linear polyesters, eg. polyethylene terephthalate. Advantageously, the magnetic dispersion produced from the chromium dioxide and a solution of the binder or binders in the presence of a dispersing agent and other additives in dispersing apparatus, for example a tubular ball mill or a stirred ball mill, is applied to the base by means of conventional coating equipment, homogeneous layers being successively applied to the base. After orientation of the magnetic particles, the applied coatings are dried, advantageously for from 2 to 5 minutes at from 50° to 90° C. Processes in which two or more magnetic layer can be applied to the base without there being any need to first dry the lowermost coating(s) have also been disclosed, and these may also be used for the manufacture of the magnetic recording media of the invention.

The magnetic layers may be subjected to a conventional surface treatment, e.g. calendering in which the coated base material is passed between polished rollers with the application of pressure and optional heating at from 50° to 100° C, preferably from 60° to 80° C. After this treatment the total thickness of the magnetic layers is in general from 3 to 30 $\mu$m and preferably from 3.2 to 14 $\mu$m, the thickness of each layer being from 0.3 to 15 $\mu$m; preferably the upper layer has a thickness of from 0.7 to 3.5 $\mu$m and the lower layer a thickness of from 2.5 to 10.5 $\mu$m.

After the coated webs have been slit into magnetic tapes, the electro-acoustic properties of the latter can be determined by conventional methods.

For the purposes of the invention, it has proved advantageous — in order to obtain recording media exhibiting improved mechanical properties — to use, in the magnetic layer adjacent to the base, a binder which has a tensile strength of at least 400 kg/mm$^2$ and an elongation at break of less than 15%, preferably less than 10%, and to use, in the upper magnetic layer, a binder having a tensile strength of from 360 to 500 kg/mm$^2$ and an elongation at break of at least 300%, preferably more than 400%. The binder of the magnetic layer adjacent to the base should have a Shore A hardness of at least 95, preferably of at least 100, whilst the binder used in the upper magnetic layer, ie. the layer in contact with the magnetic head, should have a lower Shore A hardness, ie. of from 70 to 95, preferably from 75 to 85. Particularly suitable binders for the lower magnetic layer which have these properties are vinyl chloride copolymers, eg. vinyl chloride/vinyl acetate copolymers and their commercialy available hydrolysis products containing from about 5 to 20 percent by weight of vinyl alcohol units, and copolymers of vinyl chloride with lower esters of maleic acid or fumaric acid. The binder advantageously employed for the upper layer is a soluble, thermoplastic, virtually hydroxyl-free polyester-urethane obtained from an aliphatic dicarboxylic acid of 4 to 6 carbon atoms, eg. adipic acid, an aliphatic diol of 4 to 10 carbon atoms, eg. 1,4-butanediol, and a diisocyanate of 8 to 20 carbon atoms, eg. 4,4'-diisocyanatodiphenylmethane, as described in German published application No. 1,106,959, and in particular the corresponding products which are manufactured using a branched glycol of 4 to 12 carbon atoms, eg. neopentyl glycol as the sole glycol or in admixture with a linear glycol, eg. ethylene glycol or 1,4-butanediol.

Very good results are also obtained if the binders described above for the upper and lower layers are used as mixtures in both layers, and especially if the binder preferred for the upper layer is contained in both layers.

The magnetic recording media of the invention are distinguished by a uniformly high sensitivity over the entire audible frequency range. The known improvement in the frequency response of such audio recording media at high and low frequencies brought about by the two-layer structure of the magnetic coating, the individual layers having different coercive forces, as well as an improvement in the middle frequency range can be achieved according to the invention without there being any need to maintain tight manufacturing tolerances. The use of only one type of magnetic material, ie. chromium dioxide — admittedly of different coercive force but of the same magnetizability — makes it possible to achieve uniform sensitivity over the entire frequency range for a standard bias setting, ie. the bias setting for chromium dioxide, and hence to achieve this uniform sensitivity on all commercial recording equipment.

The following Examples, in which parts and percentages are by weight unless otherwise stated, show the surprising advantages of magnetic recording media according to the invention. The electroacoustic properties were determined according to DIN 45,519 using a C 410 R reference tape, at the $CrO_2$ bias setting.

EXAMPLE 1

A tube mill having a volume of 250 parts is charged with 200 parts of steel balls of from 6 to 8 mm diameter, and with the following mixture: 37.2 parts of acicular chromium dioxide having the characteristics given below; 2.8 parts of conductive carbon; 0.2 part of stearic acid; 0.8 part of isopropyl myristate; 26.5 parts of a 13% strength solution of a thermoplastic polyester-urethane, obtained from adipic acid, 1,4-butanediol and 4,4'-diisocyanatodiphenylmethane, in a mixture of equal parts of tetrahydrofuran and dioxane; 11.5 parts of a 13% strength solution of a polyvinylformal in the same solvent mixture; and 36.0 parts of tetrahydrofuran and dioxane in a ratio of 1:1.

The mixture is dispersed for 5 days and then a further 21.6 parts of the polyester-urethane solution and 8.5 parts of the polyvinylformal solution are added.

After dispersing the resulting mixture for from 1 to 2 days, the magnetic dispersion obtained is filtered under pressure through filter paper and applied by means of a knife coater to a 12 $\mu$m thick polyethylene terephthalate film.

When manufacturing a two-layer magnetic recording medium, the two magnetic dispersions are applied in immediate succession to the base film by means of two coaters, without intermediate drying of the lower layer being effected. Drying of the two applied layers is effected at from 70° to 90° C in the course of about 2 minutes.

The magnetic layer is calendered by passing the coated film between a pair of rollers, one of polished steel heated to 80° C and the other having a shell of resin-bonded paper, the nip pressure being about 3 kg/cm.

Characteristics of the magnetic pigments employed and of the magnetic recording media obtained

| CrO$_2$ | L type (lower layer) | U type (upper layer) |
|---|---|---|
| surface area [m$^2$/g] | 19.9 | 30.5 |
| coercive force [kiloamps/m] | 36.8 | 47.7 |

| Examples | 1.1 | 1.2 | 1.3 | 1.4 |
|---|---|---|---|---|
| CrO$_2$ type | U type (upper layer) | L type (lower layer) | commercial CrO$_2$/Fe$_2$O$_3$ tape | upper layer, U type lower layer, L type |
| thickness of magnetic coating ($\mu$m) | 6 (one layer) | 6 (one layer) | 5.5 (two layers) | 2.8 upper layer 3.2 lower layer |
| all data in dB | | | | |
| S (sensitivity) | −2.0 | +0.8 | +4.5 | +1.3 |
| maximum output level at long wavelengths (A$_S$) | −0.5 | +3.6 | +4.7 | +1.7 |
| maximum output level at 4 kc/s (A$_{4\,kc/s}$) | — | — | −2.0 | +0.5 |
| frequency response | +0.8 | −2.7 | −4.5 | +2.4 |
| maximum output level at short wavelengths (A$_L$) | +3.2 | −1.5 | −0.6 | +4.4 |
| reference level-to-weighted noise ratio (RG$_o$) | +0.3 | −0.8 | −0.5 | −0.5 |

Examples 1.1 and 1.2 are comparative examples with a single CrO$_2$ magnetic layer. The comparative product with a CrO$_2$ upper layer and Fe$_2$O$_3$ lower layer cannot be used at the CrO$_2$ bias setting because of the poor sensitivity at high frequencies. Example 1.4 shows the advantages achieved by the invention, ie. a very good maximum output level over the entire frequency range, coupled with improved sensitivity.

EXAMPLE 2

Magnetic tapes having a magnetic lower layer (L), upper layer (U) and double layer (L + U) are produced as described in Example 1, chromium dioxide pigment having the following characteristics being used:

| CrO$_2$ | L type | U type |
|---|---|---|
| surface area (m$^2$/g) | 19.9 | 26.1 |
| coercive force (kiloamps/m) | 37.5 | 37.5 |

The electro-acoustic properties are as follows:

| Example | 2.1 | 2.2 | 2.3 |
|---|---|---|---|
| | U type | L type | upper layer, U type lower layer, L type |
| thickness of magnetic coating ($\mu$m) | 4.9 | 5.1 | 2.3 U 2.8 L |
| all data in dB | | | |
| S | +0.5 | +0.8 | +1.5 |
| A$_S$ | +1.3 | +3.6 | +2.5 |
| A$_L$ | −0.9 | −1.5 | +1.0 |
| F | −1.5 | −2.7 | +0 |
| RG$_o$ | −0.2 | −1.5 | −0.9 |

EXAMPLE 3

Magnetic tapes are produced as described in Example 1, chromium dioxide pigments having the following characteristics being used:

| CrO$_2$ | L type | U type |
|---|---|---|
| surface area (m$^2$/g) | 24.5 | 29.0 |
| coercive force (kiloamps/m) | 39.3 | 39.3 |

The electro-acoustic properties are as follows:

| Example | 3.1 | 3.2 | 3.3 |
|---|---|---|---|
| | U type | L type | upper layer, U type lower layer, L type |
| thickness of magnetic coating ($\mu$m) | 4.5 | 4.5 | U = 1.5 L = 3.0 |
| all data in dB | | | |
| S | −0.8 | −0.6 | +0.5 |
| A$_S$ | −1.2 | −0.1 | 0 |
| A$_L$ | −0.7 | −1.7 | +0.3 |
| F | −0.4 | −2.8 | 0 |
| RG$_o$ | +2.7 | +0.2 | +2.7 |

We claim:

1. A magnetic recording medium comprising a non-magnetic flexible base and, applied thereto, two superposed magnetizable layers, each from 0.3 to 15 $\mu$m thick, of a homogeneous mixture of acicular chromium dioxide in an organic synthetic binder with further additives, wherein the magnetizable layer adjacent to the base contains a chromium dioxide with a specific surface area, measured by the BET method, of from 15 to 25 m$^2$/g and the outer magnetic layer contains a chromium dioxide with a specific surface area, measured by the BET method, of from 26 to 35 m$^2$/g.

* * * * *